United States Patent [19]
van den Berg et al.

[11] Patent Number: 5,651,329
[45] Date of Patent: Jul. 29, 1997

[54] METHOD OF AUTOMATICALLY MILKING ANIMALS AND AN IMPLEMENT FOR APPLYING SAME

[75] Inventors: Karel van den Berg, Bleskensgraaf; Marinus Beije, Barendrecht, both of Netherlands

[73] Assignee: Maasland N.V., Weverskade, Netherlands

[21] Appl. No.: 428,484

[22] Filed: Apr. 27, 1995

[30] Foreign Application Priority Data

| Apr. 27, 1994 | [NL] | Netherlands | 9400675 |
| Nov. 4, 1994 | [NL] | Netherlands | 9401837 |
| Nov. 21, 1994 | [NL] | Netherlands | 9401937 |

[51] Int. Cl.$^6$ .................................................. A01J 5/00
[52] U.S. Cl. ........................................................ 119/14.02
[58] Field of Search .......................... 119/14.01, 14.02, 119/14.03, 14.08, 14.18

[56] References Cited

U.S. PATENT DOCUMENTS

| 3,479,008 | 11/1969 | Duncan . | |
| 3,696,790 | 10/1972 | Albright | 119/14.47 |
| 3,726,253 | 4/1973 | Duncan . | |
| 4,175,514 | 11/1979 | Souza et al. | 119/14.08 |
| 4,212,325 | 7/1980 | Phillips | 137/627.5 |
| 4,222,346 | 9/1980 | Reisgies | 119/14.18 |
| 4,516,592 | 5/1985 | Schultz et al. | 119/14.18 |
| 4,558,843 | 12/1985 | Hoefelmayr | 251/61 |
| 4,572,105 | 2/1986 | Chowdhury et al. | 119/14.18 |
| 4,867,103 | 9/1989 | Montalescot | 119/14.08 |
| 5,272,997 | 12/1993 | van der Lely et al. | 119/14.08 |
| 5,275,124 | 1/1994 | van der Lely et al. | 119/14.08 |
| 5,568,788 | 10/1996 | van den Berg et al. . | |

FOREIGN PATENT DOCUMENTS

| 0 336 729 A3 | 10/1989 | European Pat. Off. . |
| 0 513 932 A2 | 11/1992 | European Pat. Off. . |
| 0 534 565 A2 | 3/1993 | European Pat. Off. . |
| 0 555 895 A1 | 8/1993 | European Pat. Off. . |
| 2 424 700 | 11/1979 | France . |

OTHER PUBLICATIONS

"International Search Report (PCT)" for the Netherlands, Application No. 9400675 filed Apr. 27, 1995, (not translated).

U.S. application No. 08/421,794, van den Berg, filed Nov. 1995.

*Primary Examiner*—Thomas Price
*Attorney, Agent, or Firm*—Penrose Lucas Albright

[57] ABSTRACT

In a method of automatically milking animals, such as cows, use is made of teat cups, each of which is provided with a liner made of a flexible material, by means of which the teat space of a teat cup is separated from the pulsation space. During milking, a pulsating vacuum stimulating the milk yield is created in the pulsation space. When a teat cup is being connected to a teat, the pulsation space is kept at an approximately atmospheric pressure, while air is extracted from the teat space. Conversely, when a teat cup is being disconnected, in the pulsation space a vacuum is maintained and in the teat space the vacuum is neutralized.

15 Claims, 3 Drawing Sheets

METHOD OF AUTOMATICALLY MILKING ANIMALS AND AN IMPLEMENT FOR APPLYING SAME

FIELD OF THE INVENTION

The present invention relates to a method of automatically milking animals, such as cows, in which use is made of teat cups, each of which is provided with a liner made of a flexible material, by means of which the teat space of a teat cup is separated from the pulsation space that is provided to create therein a pulsating vacuum stimulating the milk yield.

BACKGROUND OF THE INVENTION

In actual practice, it appears that the animals to be milked may be annoyed by the connection and disconnection of the teat cups, particularly when such connection and disconnection is effected automatically. When a teat cup is being connected, air is drawn in through the teat cup by applying a vacuum in e.g. a milk jar, into which the milk line runs from the teat cup, while a pulsating vacuum is often at the same time applied to the pulsation space by means of a pulsator. Then the liner of the teat cup alternates between being left unloaded or drawn by suction against the wall of the teat cup, and being pushed away therefrom. When the teat cup is being connected in the latter situation, the teat entering the teat cup is impeded by this. Such a situation also occurs when disconnection takes place at a time when the liner is pressed against the teat.

SUMMARY OF THE INVENTION

To obviate the above disadvantage when connecting a teat cup, the method according to the invention is characterized in that, when a teat cup is being connected to a teat, the pulsation space is kept at an approximately atmospheric pressure, while air is extracted from the teat space. To obviate said disadvantage when disconnecting a teat cup, the method according to the invention is characterized in that, when a teat cup is being disconnected, in the pulsation space a vacuum is maintained and in the teat space the vacuum is neutralized. As to connecting a teat cup, it applies that, as soon as a predetermined vacuum has been detected in a teat space or in a milk line being in communication with this space, or after a predetermined period of time has elapsed, the approximately atmospheric pressure in the pulsation space is replaced by a pulsating vacuum, whereat the teat cup is capable of further embracing the teat. When a vacuum has been created in the teat space while the pulsation space has been put to approximately atmospheric pressure, then, as soon as the teat cup embraces the teat so far that the teat space is, at least to a substantial extent, cut off from the external or environmental atmosphere, the liner will fold inwards, resulting in that the teat cannot enter the teat space any further. By putting the pulsator into operation, an alternating vacuum is produced in the pulsation space, which causes that first the liner is drawn again towards the wall by suction and, consequently, the teat is allowed to enter the teat cup further. As it were, the teat cup is connected in phases, which is much more pleasant to the animal. When the teat cup is being disconnected, it applies that, as soon as the milk flow obtained has fallen to below a predetermined value, the pulsating vacuum in the pulsation space is replaced by a fixed vacuum which is maintained until at least the vacuum existing in the teat space has been removed. Moreover, it is advantageous when, during the connection of the teat cups as well as during milking and during the disconnection of the teat cups, the pressure in the pulsation space can be controlled by means of a pulsator under electronic or computer control. Especially when the teat cups are simultaneously connected and disconnected, a single pulsator will be sufficient. Certainly in the event that the teat cups are connected successively and are disconnected mutually independently, it will be of advantage when the pressure in the pulsation space of each teat cup, during the connection of the teat cups to the teats, the milking and the disconnection of the teat cups, is controlled by means of separate pulsators under electronic or computer control. In other words, each teat cup goes with a pulsator of its own. Because the pressure in the pulsation space is kept at a constant value during connection and disconnection, whereas use is made of an alternating vacuum in the pulsation space during milking, it is important that the suction stroke and/or idle stroke and/or the vacuum level of a pulsator is controllable by electronic or computer means. Through the capability of controlling the suction stroke, the idle stroke and the vacuum level of a pulsator, it is feasible to control, by electronic or computer means, repeatedly the pulsation ratio and/or the pulsation rate and/or the vacuum level of a pulsator for each animal and, when there are provided four pulsators, for each udder quarter individually. By adjustment of the pulsation ratio, the pulsation rate and the vacuum level for each individual quarter of an udder for each individual animal, it is feasible to attune the milking time, the stimulation of the milk yield and the development of the milk yield as a function of time optimally to the respective animal at any time. Because a pulsating vacuum in the pulsation space fairly often appears to exert a certain influence on the vacuum in the milk line, it can be desirable that, during milking, in a teat space or in a milk line connected to this space the vacuum is measured permanently and is kept at a constant value through the intermediary of a computer. The method according to the invention, as set forth hereinbefore, is particularly advantageous in applications where the teat cups are automatically connected to, and disconnected from an animal's teats by means of a milking robot.

Another problem occurs during the rinsing of the teat cups after milking. In practice, hereto there is provided a rinsing circuit which includes the teat cups, the milk line and the milk jar, with a rinsing liquid being sucked through the teat cups via separate rinse jetters by the vacuum provided in the milk jar. Here, the supply of rinsing liquid through the teat cups can vary to a large extent, which is felt to be disadvantageous. According to the invention, this problem is solvable by releasing and closing the rinsing liquid supply lines of the individual rinse jetters either directly by a computer or by means of an electronically controlled or computer-controlled pulsator. In particular, it is advantageous to release and close the individual supply lines of the rinse jetters one after the other in time. In practice, this is easily feasible when all of the supply lines of the rinse jetters are released and closed by individual pulsators, certainly when there is already provided a pulsator for each teat cup.

According to the invention, pre-rinsing by means of water of approximately 32° C. to 42° C., especially of about 37° C., can take place in the rinsing circuit. At this temperature, fatty materials in the milk residues present in the various parts of the milking implement can be removed, while the proteins in these milk residues are prevented from solidifying.

According to a further aspect of the invention, the rinsing circuit may be closed, while therein hot water containing a detergent or cleaning agent is fed, i.e. through the circuit comprising the teat cups, the milk lines connected thereto and a collecting element, such as a milk jar, into which these milk lines discharge. The water temperature is then preferably between 20° C. and 70° C., and more particularly between 40° C. and 50° C. The rinsing liquid is drawn in from a rinsing liquid tank by the vacuum applied in the milk jar, and it is pumped back therefrom into the rinsing liquid tank again. Moreover, in particular, in the rinsing circuit there may be included one or a plurality of temperature sensors, by means of which, using a computer and an adjustable hot-water supply or a heater element in the tank from which the rinsing liquid is put into circulation, the rinsing liquid temperature is kept constant at least during rinsing. In an other embodiment, the rinsing circuit may be open, while therein during a certain time, preferably in the order of two or five minutes, hot water or steam is fed, i.e. through the circuit comprising the teat cups, the milk lines connected thereto and a collecting element, such as a milk jar, into which these milk lines discharge. Here, water having a temperature which is between 70° C. and 100° C., and preferably more than 80° C., can then be led from e.g. a water heater, through the rinsing circuit which includes the milking apparatus, to the sewer.

In addition to a method, the invention also relates to an implement for automatically milking animals, such as cows, in which the method as set forth hereinbefore can be applied. Then, the implement is provided with teat cups and a collecting element, such as a milk claw or a milk jar, into which the milk obtained from each udder quarter is fed via separate milk lines, while also each of the teat cups is provided with a liner made of a flexible material, by means of which the teat space of a teat cup is separated from the pulsation space provided to apply therein a pulsating vacuum stimulating the milk yield. According to the invention, the implement is then characterized in that for each teat cup there is provided a computer-controlled pulsator to control the pressure in the pulsation space of a relevant teat cup. In addition, in the milk line connected to a teat cup there may be included a vacuum sensor whose output signals are supplied to a computer which, as soon as a predetermined vacuum detected by the vacuum sensor has been found in the milk line, causes the approximately atmospheric pressure in the pulsation space to be replaced by a pulsating vacuum. Moreover, in the milk line connected to a teat cup there may be included a flow sensor whose output signals are supplied to a computer which, as soon as the milk flow obtained has fallen to below a predetermined value detected by the flow sensor, causes the pulsating vacuum in the pulsation space to be replaced by a fixed vacuum which is maintained until at least the vacuum in the teat space has been removed. To make it feasible to clean efficiently the teat cups after milking, the implement comprises a rinsing circuit including rinse jetters, which circuit permits at least the teat cups to be included, while each of the rinsing liquid supply lines of the individual rinse jetters is provided with a shut-off element which is operated directly by the computer or is operated by means of a pulsator under electronic or computer control, with the rinsing liquid flow being led through the teat cups by means of said shut-off elements. When there is provided a separate pulsator for each teat cup, each shut-off element will consequently be operated by one of these pulsators, while the computer control of the pulsators sees to it that the system of shut-off elements successively opens and closes the rinsing liquid supply line to the individual rinse jetters.

According to still another aspect of the invention, during milking, the vacuum in the teat space or in the milk line connected thereto can be measured permanently by means of vacuum sensors included in the individual milk lines, with the vacuum sensor output signals being supplied to the computer which ensures that the pressure in the milk lines is kept constant by means of a computer-controlled shut-off element in each of the milk lines.

A particularly advantageous embodiment of the implement for automatically milking, as set forth hereinbefore, is obtained when it is also provided with a milking robot for both automatically connecting the teat cups to an animal's teats and for automatically disconnecting same therefrom.

In a preferred embodiment according to the invention, the rinsing circuit comprises a first supply line for a pre-rinsing liquid and a second supply line for a further rinsing liquid from the rinsing liquid tank, said first and second supply lines being connected to a rinsing line of the rinsing circuit. Accordingly, the invention also relates to an implement for automatically milking animals, such as cows, in which the method as set forth hereinbefore can be applied, which implement is provided with teat cups and a collecting element, such as a milk claw or a milk jar, into which the milk obtained from each udder quarter is fed via milk lines, as well as a rinsing circuit for cleaning at least the teat cups, the collecting element and the milk lines, and a rinsing liquid tank and rinsing lines, this implement being characterized in that the rinsing circuit comprises a first supply line for a pre-rinsing liquid and a second supply line for a further rinsing liquid from the rinsing liquid tank, said first and second supply lines being connected to a rinsing line of the rinsing circuit. In this way it is practicable to clean the rinsing circuit with rinsing liquid from the rinsing liquid tank immediately after the rinsing circuit has been cleaned with a pre-rinsing liquid. In this connection, the rinsing liquid tank can be filled with pre-rinsing liquid prior to, or during cleaning, while subsequently the rinsing liquid can be warmed up to a temperature of between 70° C. and 100° C. for hot-cleaning.

According to a feature of the invention, means for temperature control are provided, with the aid of which it is possible to adjust the temperature of the rinsing liquid with which the first and second supply lines are supplied. According to a further feature of the invention, the temperature-control means for the pre-rinsing liquid of the first supply line comprise a thermostat with a supply line for hot and cold water. The thermostat can be designed as a mixing tap which is adjustable by means of an operator and/or a computer, the arrangement being such that pre-rinsing takes place by water of approximately 37° C.

According to still another feature of the invention, the temperature-control means for the second supply line comprise a heater element and a thermostat. According to a further feature of the invention, the rinsing circuit can be supplied with (pre-)rinsing liquid via the first or via the second supply line, because the first supply line and the second supply line are provided with computer-controlled cocks. To prevent the rinsing liquid tank from "boiling dry", according to a further feature of the invention, the rinsing liquid tank comprises a sensor to determine the level of the rinsing liquid in the rinsing liquid tank.

For the advancement of the cleaning of the various parts included in the rinsing circuit, according to an aspect of the invention, a supply line suitable for supplying a base and/or an acid to the rinsing liquid tank is provided, the supply line comprising a computer-controlled cock.

According to a further feature of the invention, the supply line(s) for base and/or acid is/are provided with (a) Venturi element(s). The advantage of adding base and/or acid by means of a Venturi element in relation to e.g. a displacement pump is that a Venturi element is inexpensive and does not comprise any moving parts which, as is the case with a pump, are liable to wear, which causes that, by comparison with a Venturi element, a pump is less reliable than a Venturi element. According to a further feature of the invention, a rinsing liquid supply line is connected to the first supply line for the supply of rinsing liquid to a cleaning implement for cleaning of cleaning elements, with the aid of which the udder and/or teats of an animal are cleaned, while further in the rinsing liquid line there is included a Venturi element connected, via a further line, to a tank containing a disinfecting liquid, such as chlorine. According to a feature of the invention, it is possible to arrange by means of a computer-controlled cock included in the further line whether or not a disinfecting liquid is added to the rinsing liquid. To determine how much liquid is applied to the rinsing liquid via the line connected to the Venturi element, according to a further feature of the invention, the Venturi element is adjustable, the arrangement being such that the flow rate of the line connected to the Venturi element is controllable.

In addition to the fact that during milking a vacuum is applied to the teat cup via the milk line, a pulsating vacuum is mostly simultaneously applied to the pulsation space of the teat cup through a pulsation line and a pulsator. When the pulsation line becomes leaky due to e.g. wear or kicking by the animal, or in the worst case, when it gets loose from the teat cup and may come into contact with the floor of the cow-shed, it is possible that, because a vacuum still exists in the pulsation line, dirt, such as manure, present on the floor is sucked into the vacuum circuit via the pulsation line. As a result, the pulsator can be deranged or become defective, while lines and/or cocks can become clogged. Cleaning and repairing defective and/or contaminated parts of the vacuum circuit is a time-consuming and, therefore, costly job. To obviate the above drawbacks or to reduce them at least, according to a feature of the invention, a manure separator is included in the pulsation line. In a preferred embodiment of the invention, the manure separator is included and disposed before the pulsator(s), so that the pulsator(s) is/are not in direct danger of being clogged. According to a further feature of the invention, a manure separator is included in each of the four pulsation lines. In a preferred embodiment of the invention, the manure separator comprises a vessel to which the pulsation line, interrupted by the vessel, is connected at the top. Vacuum exists in the vessel just like in the pulsation line, so that manure possibly sucked in through one part of the pulsation line falls into the vessel and, consequently, does not arrive at the other part of the pulsation line. The vessel should be exchanged or cleaned after a certain time lapse.

According to still another feature of the invention, a milk-level sensor is provided in the milk jar, while near the bottom thereof an air line is connected thereto, by means of which air line it is possible to blow air bubbles through the milk collected in the milk jar in order that the milk is appropriately mixed, while there is provided a milk sampling apparatus connected to the milk discharge line of the milk jar, by means of which apparatus one or a plurality of milk samples can be drawn from a quantity of milk predefined by means of the milk-level sensor, so that each milk sample comprises roughly the same quantity of milk, irrespective of the animal's milk yield.

The invention will now be further explained with reference to a first, a second, and a third exemplary embodiment as represented by the accompanying

DESCRIPTION OF THE PREFERRED EMBODIMENTS

Figure 1:
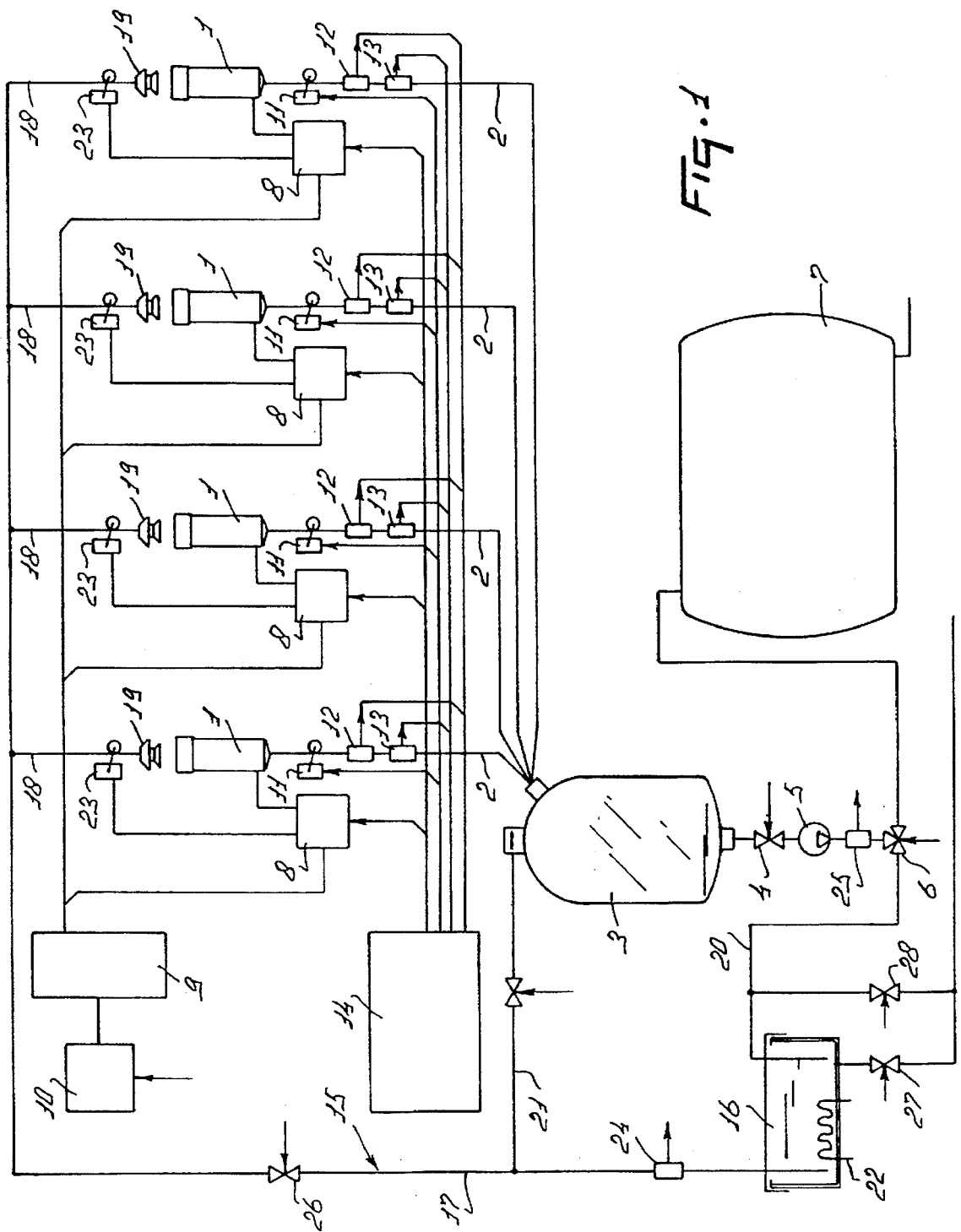
FIG. 1 is a schematic representation of a first preferred embodiment of the present invention.

In the implement as depicted in FIG. 1, the teat cups are indicated by the reference number 1. These teat cups are each provided with a liner made of a flexible material, by means of which the teat space of a teat cup 1 is separated from the pulsation space. The teat cups 1 are capable of being automatically connected to, and disconnected from an animal's teats by means of a milking robot (not shown). A milk line 2 is connected to the teat space of each of the teat cups 1. All these milk lines 2 discharge into a milk jar 3. The milk jar 3 communicates with a milk tank 7 through a cock 4, a pump 5 and a cock 6. For each teat cup 1 there is provided a pulsator 8, which produces a milk-yield stimulating, pulsating vacuum in the pulsation space of the respective teat cup 1 during milking. Each of the pulsators 8 is connected to a vacuum balance tank 9, wherein a stabilized vacuum is generated by means of a motor-driven pump 10. In each of the milk lines 2 connected to the teat cups 1 there is included a shut-off element 11, a vacuum sensor 12 and a flow sensor 13 in that order. The implement further comprises a computer 14, by means of which the various parts of the implement for automatic milking are controlled, while it should be specially mentioned that the pulsators 8 are under electronic or computer control, and the sensors 12 and 13 send their acquired information concerning the vacuum or the milk flow in the respective lines 2 to the computer 14. The suction stroke, the idle stroke and the vacuum level of the pulsators 8 are computer-controllable. This means that the parameters relevant to the milking, i.e. the pulsation rate, the pulsation ratio and the vacuum level are computer-controlled and attunable to the milk yield from the individual udder quarters of each animal.

When teat cups 1 are to be connected, a vacuum is created in the milk jar 3 by means of the vacuum balance tank 9 and, consequently, air is sucked in through the teat space of the respective teat cups 1 and milk lines 2, of course, insofar as these have been released by the shut-off elements 11. When teat cups 1 are being connected simultaneously, then the shut-off elements 11 will release the respective milk lines 2 simultaneously; when, however, teat cups 1 are being connected successively, then the shut-off elements 11 will also release the respective milk lines 2 successively. As soon as a vacuum has been applied to a milk line 2, subsequently, as long as the relevant teat cup 1 is not yet connected to a teat, air is sucked in through teat cup 1, thereby causing the pressure in the teat space still to remain equal to that of the environment. When the pulsator 8 now applies also an ambient pressure or a pressure slightly lower than the ambient pressure to the pulsation space of this teat cup 1, the liner of this teat cup 1 will be unloaded or even be slightly sucked against the wall thereof. In this situation, teat cup 1 can be put on the teat of an animal to be milked, without the liner suffering badly from this operation. As soon as the teat cup 1 has been put fully on the teat of the animal, in the teat space there will be created a vacuum which is measured by the vacuum sensor 12 and, on reaching a predetermined value, this vacuum causes the sensor 12 to issue a signal representing this value to the computer 14 which, in its turn, controls the pulsator 8 to apply a pulsating vacuum to the pulsation space of the teat cup 1. To stimulate the milk yield, initially the pulsation frequency can be higher than during a further stage of the milking. When the milk flow begins to decrease again after some time of milking and it comes below a predetermined threshold value, the flow sensor 13 will issue a signal to the computer 14 which then commands the pulsator 8 to substitute the pulsating vacuum in the pulsation space of the teat cup 1 with a fixed vacuum, so that the liner of the teat cup 1 is drawn against wall of the teat cup 1. This fixed vacuum will then be of the same magnitude or somewhat less than the vacuum in the milk line 2. When the liner has been drawn towards the wall of the teat cup 1, the vacuum in the teat space can subsequently be removed and teat cup 1 be disconnected. Such a difference in pressure is created across the liner of teat cups 1, through the computer-controlled pressure in the pulsation space relative to the pressure in the teat space, that the wear of this liner is restricted considerably.

When undesirable vacuum fluctuations occur in the teat space and milk lines 2, such fluctuations being detectable by permanently measuring the vacuum by means of the vacuum sensors 12, it is practicable by means of the computer 14 to derive control signals which, applied to the respective shut-off elements 11, effect that the said vacuum is kept constant. A vacuum sensor 12, the computer 14, and a shut-off element 11 make up a control circuit to keep the pressure in a relevant milk line 2 at a constant value established by computer 14.

Apart from applying the appropriate pressure to the pulsation space, the pulsators 8 can also fulfill a function during the rinsing of the teat cups 1. For the purpose of rinsing, the implement is provided with a rinsing circuit 15 comprising a rinsing liquid tank 16, a common rinsing liquid supply line 17, separate rinsing liquid supply lines 18 each being connected to the common rinsing liquid supply line 17, and, connected to the individual rinsing liquid supply lines 18, rinse jetters 19 to which the teat cups 1 can be connected. To obtain a closed rinsing circuit, the milk jar 3 is capable of being connected to the rinsing liquid tank 16 again through the cock 6 and a return line 20. Furthermore, a "shortened" rinsing circuit through the milk jar 3 can be realized directly by means of the rinsing liquid line 21. With the aid of a heater element 22 in the rinsing liquid tank 16, water of preferably between 40° and 50° C. and containing a detergent or cleaning agent can be sucked in, by the vacuum existing in the milk jar 3, via the common rinsing liquid supply line 17, the individual rinsing liquid supply lines 18, the rinse jetters 19, the teat cups 1 and the milk lines 2. This rinsing liquid is pumped back again to the rinsing liquid tank 16 via the cock 4, the pump 5, and the cock 6. When the rinsing liquid is led through the individual rinsing liquid supply lines 18, it may happen that the amounts of rinsing liquid flowing through the various teat cups are greatly different from each other. Therefore, a shut-off element 23 is included in each of the rinsing liquid supply lines 18. Each shut-off element 23 is under the control of a pulsator 8. The pulsators 8 can be controlled by the computer 14 such that the shut-off elements 23 connected to the respective pulsators 8 successively release and close the rinsing liquid supply lines 18 so as to lead the rinsing liquid successively in time through the respective teat cups 1. Apart from making use of a closed rinsing circuit, an open rinsing circuit can also be utilized. In case of the latter, hot water of roughly more than 75° C. or possibly steam is drawn from the rinsing liquid tank 16 and fed through the common rinsing liquid supply line 17, the individual rinsing liquid supply lines 18 and the rinse jetters 19, through teat cups 1, and from there it is drained away through the milk lines 2 and the milk jar 3 to e.g. a sewer by means of the pump 5. Although water is wasted hereby, it is just because the temperature of the rinsing water is exceptionally high or because even steam is used that the through-flow time of the rinsing water through the teat cups and milk lines can be kept very short, e.g. to the amount of between two and five minutes. Furthermore, then it is not needed to add chemical cleaning agents to the water. When the milk tank 7, too, should possibly be cleaned, especially in the latter case rinsing water can be led from the milk jar 3, through the pump 5, and via the cock 6, to the milk tank 7. To have the rinsing of teat cups 1 effected as suitably as feasible, the temperature of the rinsing liquid is kept as constant as possible during rinsing. For this purpose, temperature sensors 24 and 25 are included in the rinsing circuit 15. These temperature sensors 24 and 25 communicate with the computer 14, which in its turn controls the heater element 22 in the rinsing liquid tank 16. Finally, it should be noted that the drawing includes various computer-controlled cocks 26, 27, and 28 (not mentioned before) which are of importance to the initiation and termination of the rinsing of teat cups 1, milk lines 2 and milk jar 3 and to the draining of the rinsing liquid, either directly or through the rinsing liquid tank 16 to the sewer.

Figure 2:
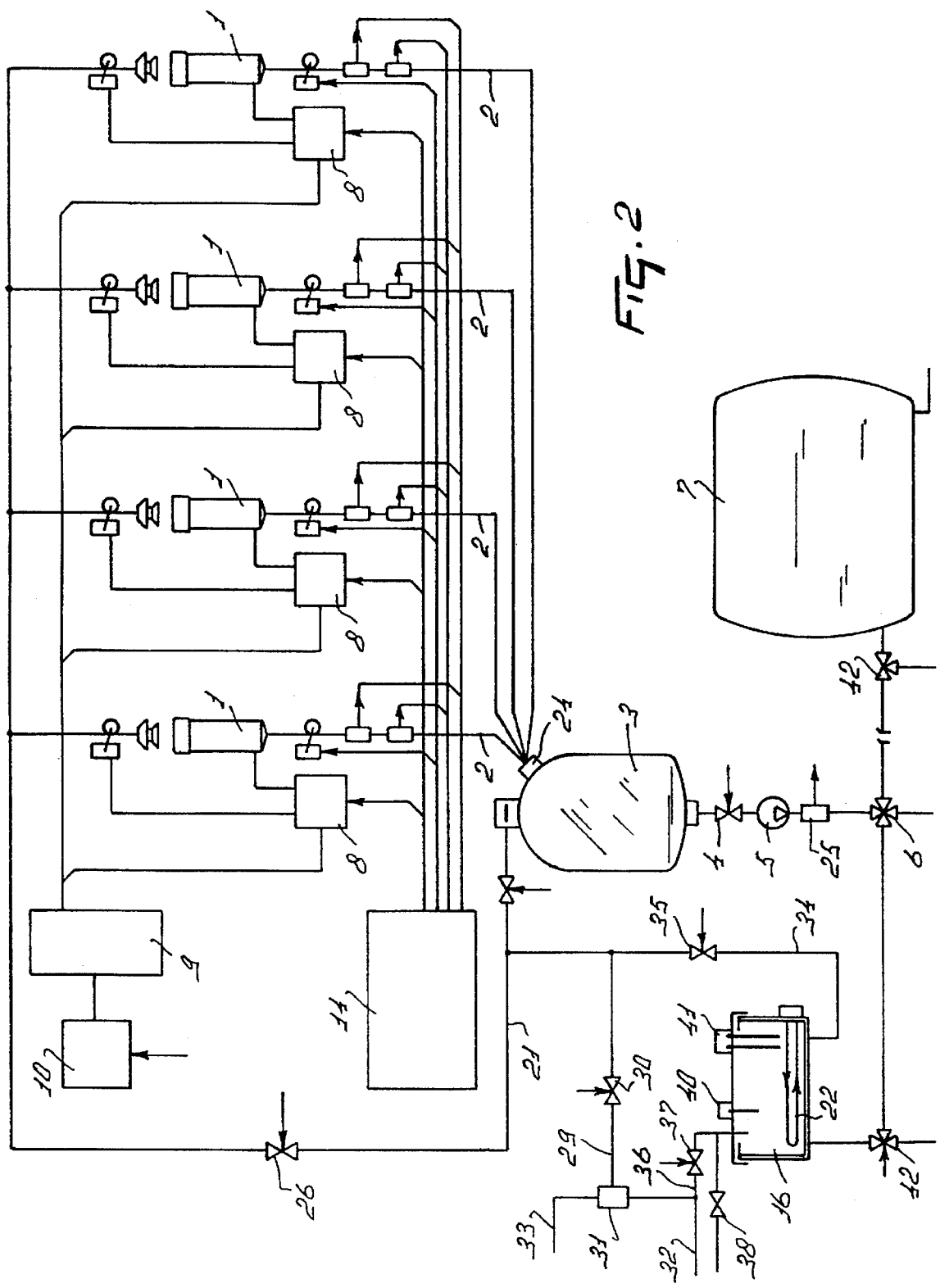
FIG. 2 is a schematic representation of a second preferred embodiment of the instant invention.

FIG. 2 represents a second exemplary embodiment of the invention, wherein corresponding parts of FIG. 1 are indicated by the same reference numbers. In the implement represented in FIG. 2, a first supply line 29 for rinsing liquid, such as water, is connected to the rinsing liquid supply line. A computer-controlled cock 30 is included in the first supply line 29. To be capable of controlling the temperature of the rinsing liquid, the first supply line 29 comprises a thermostatically controlled cock 31, to which a hot-water line 32 and a cold-water line 33 are connected. For pre-rinsing milk lines 2, teat cups 1 and milk jar 3, with the aid of the computer 14 the thermostatically controlled cock 31 is set to a rinsing liquid temperature of between 32° C. and 42° C., preferably about 37° C., and the computer-controlled cock 30 is opened for approximately five to seven minutes.

Furthermore, running via the rinsing liquid tank 16, a second supply line 34 for a further rinsing liquid is connected to the rinsing liquid supply line 21. The second supply line 34 also includes a cock 35 controlled by the computer 14. In the present embodiment of the invention, the further rinsing liquid is hot water, which is allowed to flow into the rinsing liquid tank 16 via a line 36 branched off from the hot-water line 32, when the computer-controlled cock 37 included in the line 36 is opened by a signal from the computer 14. Connected to the line 36 are also lines 38, permitting a base or an acid to be added to the hot water. The lines 38 also include computer-controlled cocks 39.

In the second exemplary embodiment, the rinsing liquid tank 16 comprises a heater element 22 controlled by a thermostat 40 enabling water to be heated to a temperature of about 78° C., which is a temperature very suitable for hot-cleaning. To prevent the rinsing liquid tank 16 from "boiling dry", the rinsing liquid tank comprises liquid-level sensors 41, which issue a signal to the computer 14 if no or insufficient water is present in the rinsing liquid tank. In the rinsing circuit, in the vicinity of the milk jar 3 there is also included a temperature sensor 24, with the aid of which the rinsing liquid temperature can be measured, which measurement is issued to the computer 14. The temperature sensor 24 is preferably provided at the end of the rinsing circuit, i.e. remotely from the first 29 and second 34 supply lines, so that at the end of the rinsing circuit it can be checked whether the desired and/or minimum temperature of the (pre-)rinsing liquid has been reached there, too. If the minimum temperature has not been reached, in the event of pre-rinsing computer 14 issues a signal to the thermostatically controlled cock 31, or in the event of main-rinsing, to the thermostat 40, until the desired minimum temperature of the (pre-)rinsing liquid is obtained.

For the purpose of draining the rinsing liquid into e.g. the sewer, the rinsing circuit comprises two further computer-controlled cocks 42. Possibly infected milk or fore-milk can be discharged into the sewer upon the opening of the computer-controlled cock 6. The computer-controlled cock 6 is preferably disposed close by the milk jar 3.

Figure 3:
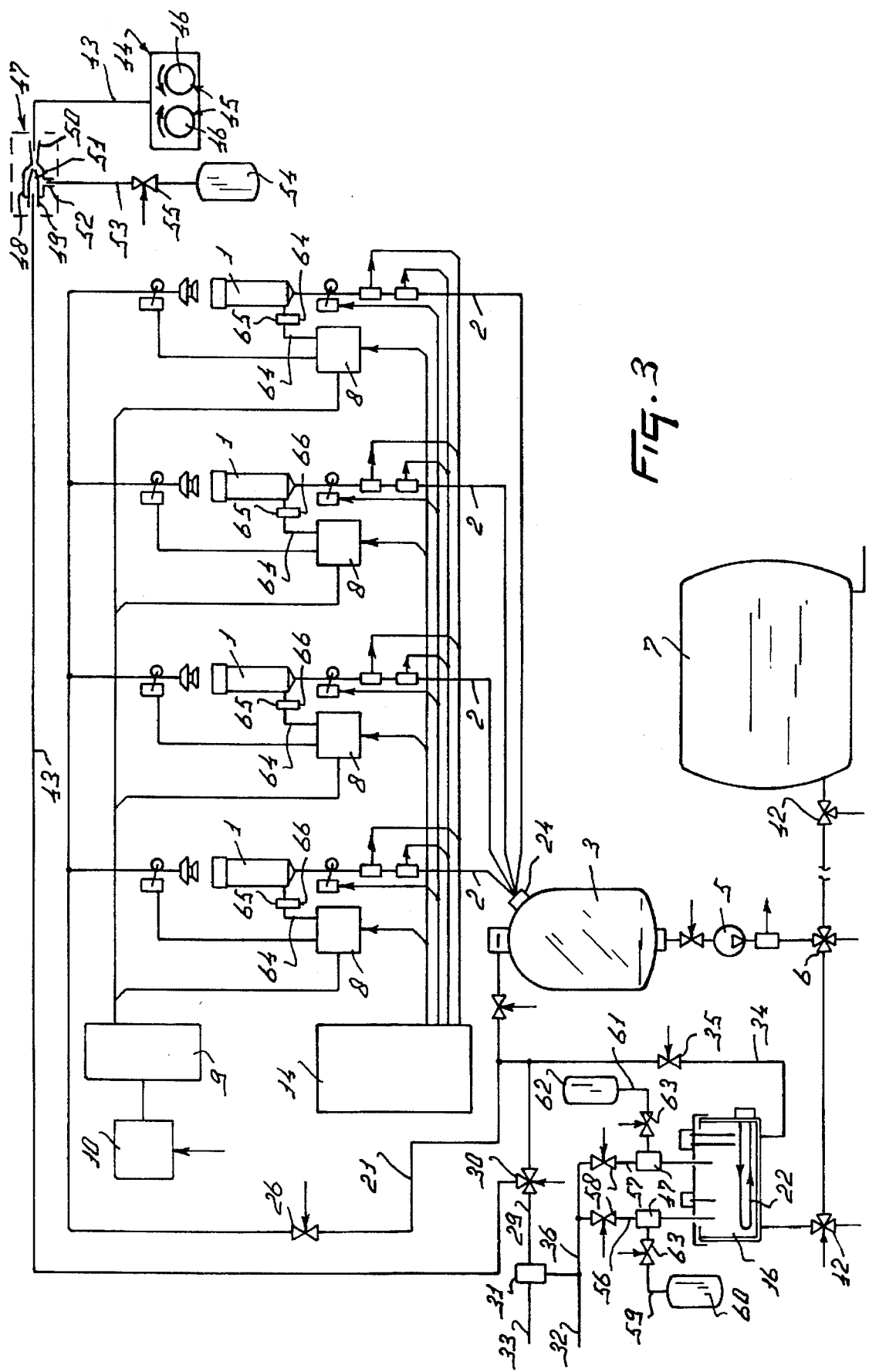
FIG. 3 is a schematic representation of a third preferred embodiment of the instant invention. The figures include only those parts of the implement which are of relevance to the explanation of the present invention. It will be obvious that the invention is by no means limited to these embodiments; these examples are only intended to illustrate the invention.

FIG. 3 represents a third exemplary embodiment of the invention, wherein corresponding parts of FIGS. 1 and 2 are indicated by the same reference numbers. In the implement represented in FIG. 3, the computer-controlled cock 30 is designed as a three-way cock. A rinsing liquid line 43 connected to the three-way cock 30 enables rinsing liquid supplied via the first supply line 29 to be applied to a cleaning implement 44 for cleaning of cleaning elements 45, by means of which the udder and/or the teats of an animal are cleaned. In the present exemplary embodiment, the cleaning elements 45 are designed as two cleaning rolls 46 disposed at a certain distance from each other and which can be put under the animal's udder by means of a robot (not shown). During cleaning, the teats being in between the cleaning rolls 46 driven in mutually opposite directions are rubbed clean.

A Venturi element 47 is included in the rinsing liquid line 43. This Venturi element 47 comprises a cylindrical housing 48 provided with an inlet nipple 49 and an outlet nipple 50. The inlet nipple 49 extends in the cylindrical housing 48 as far as the outlet nipple 50 and has a tapered end part 51. A tank 54 containing disinfecting liquid, such as chlorine, is connected to the cylindrical housing 48 through a further nipple 52 and a further line 53. A computer-controlled cock 55 is included in the further line 53. If it is desired to clean the cleaning elements 45 with a chlorine-water mixture, such a mixture can be obtained by opening the computer-controlled cock 55. Water flowing through the Venturi element 47 makes that in the cylindrical housing 48 there is created a vacuum, as a result of which the disinfecting liquid present in the tank 54 is sucked into the cylindrical housing 48 and is mixed with water.

In the exemplary embodiment in accordance with FIG. 1, the addition of acid or base to the rinsing liquid tank 16 takes place in a similar way as the addition of disinfecting liquid to the rinsing liquid line 43. For this purpose (shown in FIG. 3), the line 36 branches into a first line 56 and a second line 57, both of which end in the rinsing liquid tank 16. In the first line 56 and in the second line 57 there is included a Venturi element 47, while computer-controlled cocks 58 are included in both lines 56 and 57. Through a line 59, a tank 60 containing a basic liquid is connected to the Venturi element 47 included in the first line 56, while through a line 61, a tank 62 containing an acid is connected to the Venturi element 47 included in the second line 57. Furthermore, computer-controlled cocks 63 are included in the lines 59 and 61.

Each of the teat cups 1 is also provided with a pulsation line 64, which includes a manure separator 65. The manure separator 65 comprises a vessel 66 to which, near the top, interrupted by the vessel 66, the pulsator line 64 is connected. The manure separator 65 is disposed in the pulsation line 64 between the teat cup 1 and the pulsator 8.

Although this invention has been disclosed and discussed primarily in terms of specific embodiments, it should be understood that this description has been provided for clearness of understanding only, and no unnecessary limitations should be understood therefrom, for modifications obvious to those skilled in the art will be within the spirit and scope of the appended claims.

Having thus described my invention, what I claim as new and desire to secure by Letters Patent of the United States is:

1. A method of automatically milking animals, such as cows comprising utilizing a teat cup, which is provided with a liner made of a flexible material, and by means of said flexible material, a teat space in said teat cup is separated from a pulsation space in said teat cup, said pulsation space provided to create therein a pulsating vacuum stimulating a milk yield, the improvement comprising:

maintaining in said pulsation space a vacuum and suppressing the vacuum in said teat space sufficiently to cause said teat cup to disconnect automatically from a teat.

2. An improved method according to claim 1 further comprising, maintaining said pulsation space at an approximately atmospheric pressure, while removing air from said teat space, when said teat cup is being connected to a teat.

3. An improved method according to claim 2, further comprising substituting a pulsating vacuum for said approximately atmospheric pressure in said pulsation space when said teat cup is in operational contact with a teat, whereby said teat cup embraces said teat further upon each cycle of pulsations of said pulsating vacuum.

4. An improved method according to claim 3 comprising accommodating said operational contact with said teat by modifying the level of said vacuum in said teat space.

5. An improved method according to claim 3 comprising maintaining said operational contact for a predetermined period of time.

6. An improved method according to claim 2, further comprising controlling the levels and durations of pressures in said pulsation space by means of a pulsator, and controlling said pulsator by electromechanical means.

7. A method according to claim 6, wherein said electromechanical means comprises a computer.

8. An improved method according to claim 2, wherein said teat cup is one of a plurality of teat cups, further comprising connecting and disconnecting said teat cups individually and separately controlling the pressure in each said pulsation space of each said teat cups by separate pulsators respectively associated with each said pulsation space.

9. An improved method according to claim 2, further comprising automatically connecting and disconnecting said teat cup to and from a teat of said animal by a milking robot.

10. A method according to claim 2, further comprising measuring and maintaining a substantially constant vacuum in said teat space, via electromechanical control by a computer when said teat cup is in operational contact with a teat.

11. A method according to claim 2, further comprising cleaning said teat cup by a rinsing circuit, said rinsing circuit comprising a rinse jetter which provides a rinsing liquid to said teat cup.

12. A method according to claim 11, further comprising controlling the through-put of said rinsing liquid through said rinse jetters by a pulsator operatively associated with said teat cup.

13. A method according to claim 11, further comprising controlling the through-put of said rinsing liquid through said rinse jetters by commands emanating from a computer.

14. An improved method according to claim 1, further comprising substituting a steady vacuum for said pulsating vacuum in said pulsation space when the milk flow in said teat cup decreases to below a predetermined value.

15. A method of automatically milking animals, such as cows, utilizing a teat cup, which is provided with a liner made of a flexible material, and by means of said flexible material, a teat space in said teat cup is isolated from a pulsation space in said teat cup, said pulsation space being provided to create therein a pulsating vacuum stimulating a milk yield, the improvement comprising:

providing that said pulsation space is at approximately atmospheric pressure, while exhausting air from said teat space, when connecting said teat cup to it teat, and providing that said pulsation space is substantially below atmospheric pressure while disconnecting said teat cup from said teat.

\* \* \* \* \*